(12) United States Patent
Cheng

(10) Patent No.: US 11,931,934 B2
(45) Date of Patent: Mar. 19, 2024

(54) MOLDING MACHINE TEACHING AID

(71) Applicant: National Kaohsiung University of Science and Technology, Kaohsiung (TW)

(72) Inventor: Jui-Hung Cheng, Kaohsiung (TW)

(73) Assignee: NATIONAL KAOHSIUNG UNIVERSITY OF SCIENCE AND TECHNOLOGY, Kaohsiung (TW)

(*) Notice: Subject to any disclaimer, the term of this patent is extended or adjusted under 35 U.S.C. 154(b) by 0 days.

(21) Appl. No.: 17/888,414

(22) Filed: Aug. 15, 2022

(65) Prior Publication Data

US 2023/0241815 A1    Aug. 3, 2023

(30) Foreign Application Priority Data

Jan. 28, 2022   (TW) .................................. 111103966

(51) Int. Cl.
| | |
|---|---|
| B22D 17/10 | (2006.01) |
| B22D 17/20 | (2006.01) |
| B22D 17/26 | (2006.01) |
| B22D 17/32 | (2006.01) |
| B29C 45/04 | (2006.01) |
| B29C 45/17 | (2006.01) |
| B29C 45/74 | (2006.01) |
| B29C 45/78 | (2006.01) |
| B29C 45/80 | (2006.01) |

(52) U.S. Cl.
CPC .......... *B29C 45/0416* (2013.01); *B22D 17/32* (2013.01); *B29C 45/1774* (2013.01); *B29C 45/74* (2013.01); *B29C 45/78* (2013.01); *B29C 45/80* (2013.01); *B29C 2945/7604* (2013.01); *B29C 2945/76083* (2013.01); *B29C 2945/7618* (2013.01); *B29C 2945/76254* (2013.01); *B29C 2945/76531* (2013.01); *B29C 2945/76568* (2013.01); *B29C 2945/76658* (2013.01); *B29C 2945/76732* (2013.01)

(58) Field of Classification Search
CPC ........ B22D 17/00; B22D 17/10; B22D 17/20; B22D 17/26; B22D 17/32
USPC ... 164/151.2, 151.4, 154.2, 154.6, 303, 341, 164/342
See application file for complete search history.

(56) References Cited

FOREIGN PATENT DOCUMENTS

CN        107350449 A  * 11/2017  .......... B22D 17/203

OTHER PUBLICATIONS

Machine translation of CN 107350449 A (Year: 2017).*

* cited by examiner

*Primary Examiner* — Kevin P Kerns
(74) *Attorney, Agent, or Firm* — Muncy, Geissler, Olds & Lowe, P.C.

(57) ABSTRACT

A molding machine teaching aid includes a frame unit, a molding unit, a material supply unit, a drive unit and a monitoring unit. The molding unit includes a fixed die holder, a movable die holder, and two die kernels respectively and detachably disposed on the fixed and movable die holders. The material supply unit includes a heating module for melting a wire material, and an extruder transporting the molten material into a die cavity formed between the die kernels. The drive unit is controllable to drive movement of the movable die holder relative to the frame unit. The monitoring unit is for a user to operate to control the extruder, the heating module and the drive unit.

6 Claims, 3 Drawing Sheets

MOLDING MACHINE TEACHING AID

CROSS-REFERENCE TO RELATED APPLICATION

This application claims priority to Taiwanese Invention Patent Application No. 111103966, filed on Jan. 28, 2022.

FIELD

This invention relates to a teaching aid, and more particularly to a teaching aid that can show an injection molding process.

BACKGROUND

A mold is a manufacturing apparatus that has long been developed and that has very wide applications. In injection molding, molten material is injected between two corresponding male and female dies, and is forced to form a specific shape through the force that presses the male and female dies against each other.

In some instructional location or employee training cases, explanation in the topic of injection molding may be needed. However, a conventional mold is very bulky and heavy, and needs to be used in conjunction with the injection machine which can inject material into the mold. Therefore, it is difficult to display the entire injection molding process in a classroom, and difficult to provide each student with hands-on operation experience. The problem in the aforementioned scenario is to be improved.

SUMMARY

Therefore, an object of the present invention is to provide a molding machine teaching aid that can be placed on a desktop, that has a simple structure, and that is easy to demonstrate a molding process.

According to the disclosure, the molding machine teaching aid includes a frame unit, a molding unit, a material supply unit, a drive unit and a monitoring unit. The frame unit includes a main frame body, a first side wall that is perpendicularly connected to the main frame body, a second side wall that is perpendicularly connected to the main frame body and spaced apart from the first side wall in a clamping direction, and a plurality of slide rods each of which extends along the clamping direction and has two ends secured respectively to the first and second side walls. The molding unit includes a fixed die holder that is penetrated by the slide rods and that is fixed to the frame unit, a movable die holder that is penetrated by the slide rods and that faces the fixed die holder in the clamping direction, and two die kernels that are respectively and detachably disposed on the fixed die holder and the movable die holder. The die kernels cooperatively define a die cavity after being closed. The material supply unit includes an extruder that is disposed on the frame unit, and a heating module that is connected to the extruder for heating at least one wire material into a molten material. The extruder transports the molten material into the die cavity. The drive unit is controllable to drive movement of the movable die holder relative to the frame unit in the clamping direction to make the die kernels close to each other to be closed or moved away from each other. The monitoring unit is adapted for a user to operate to control the extruder, the heating module and the drive unit.

BRIEF DESCRIPTION OF THE DRAWINGS

Other features and effects related to the present invention will be clearly presented in the embodying manner with reference to the drawings, in which.

DETAILED DESCRIPTION

Figure 1:
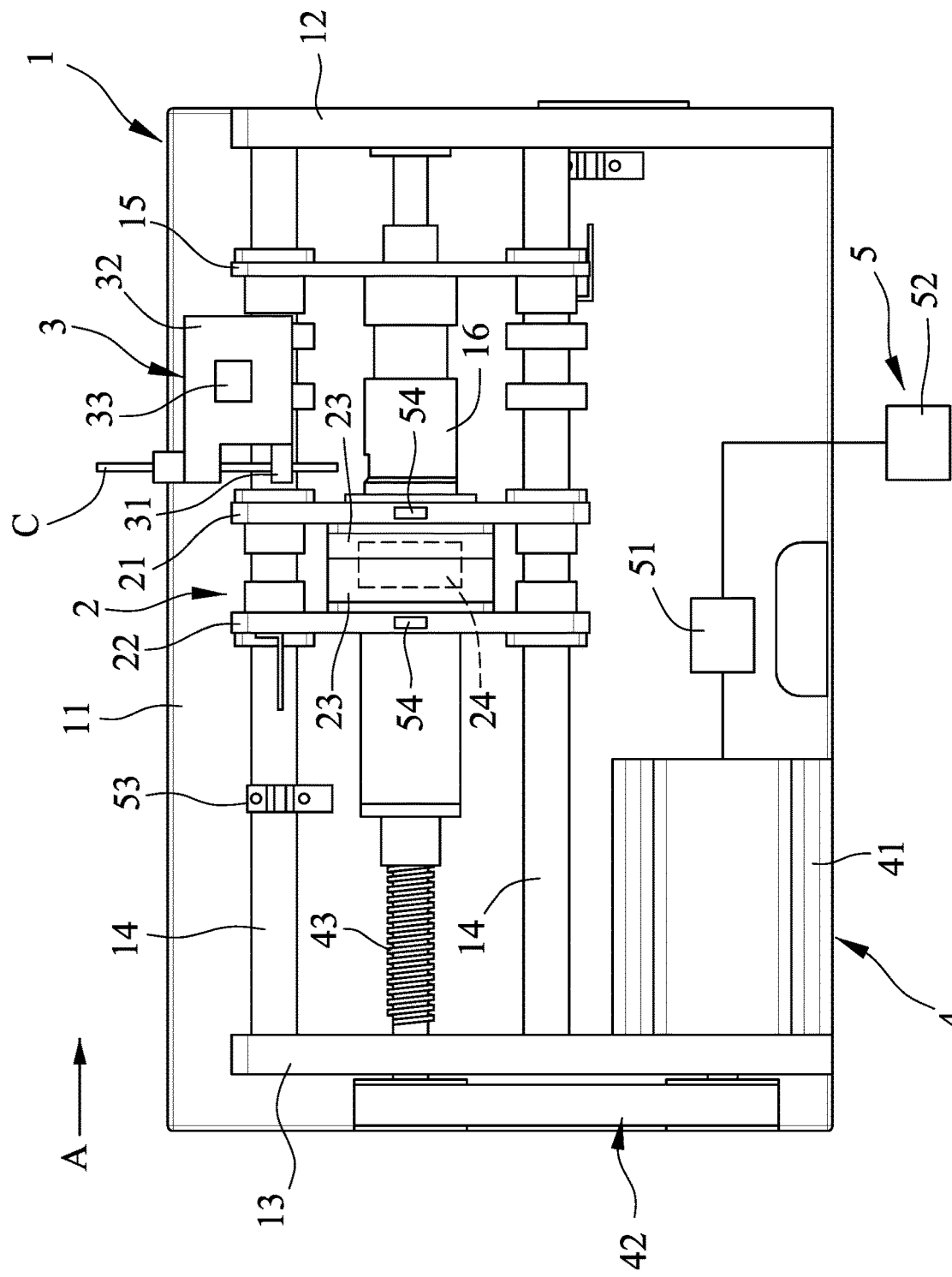
FIG. 1 is a schematic view of an embodiment of the molding machine teaching aid according to the disclosure.
Figure 2:
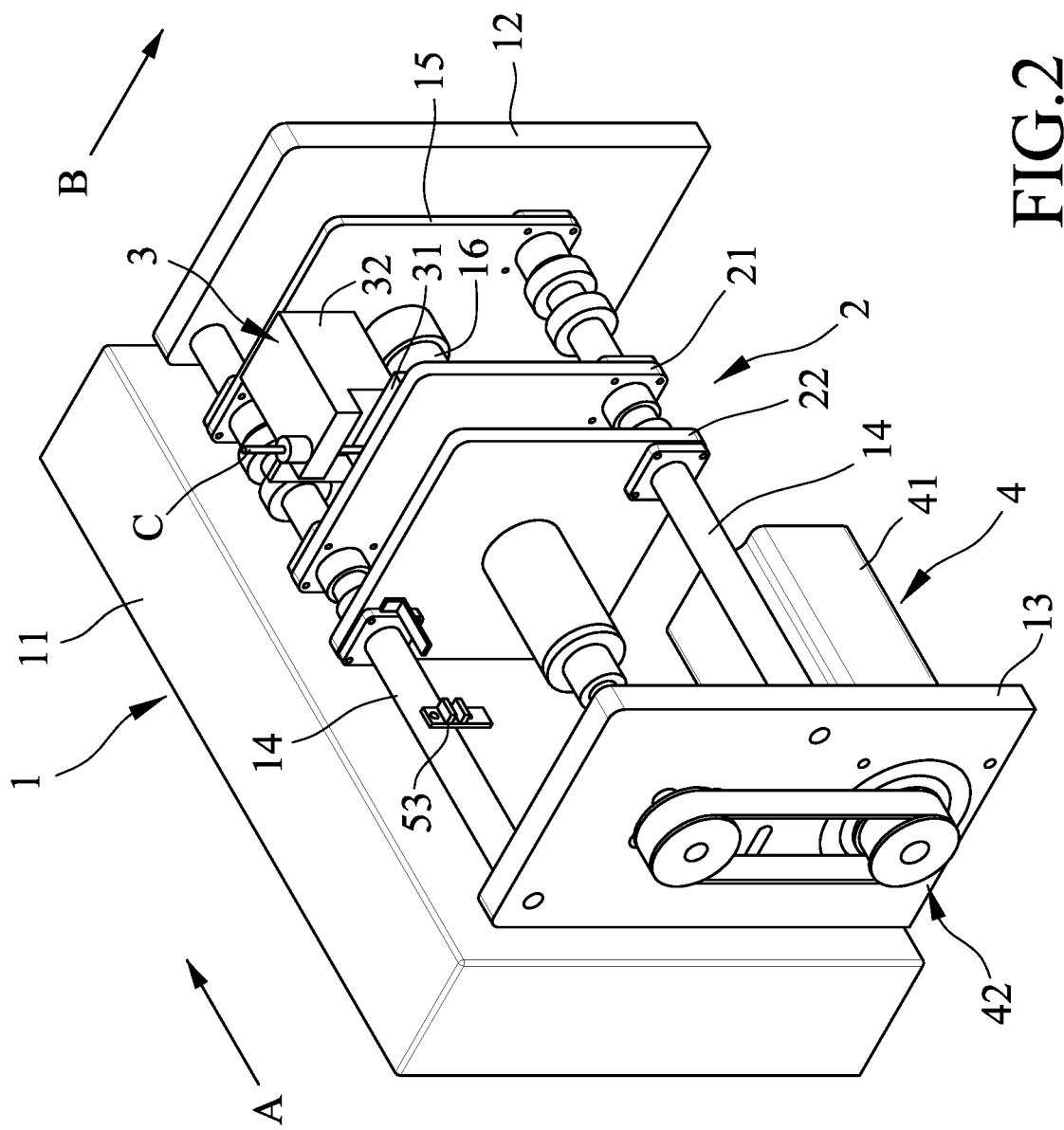
FIG. 2 is a perspective view illustrating the embodiment.
Figure 3:
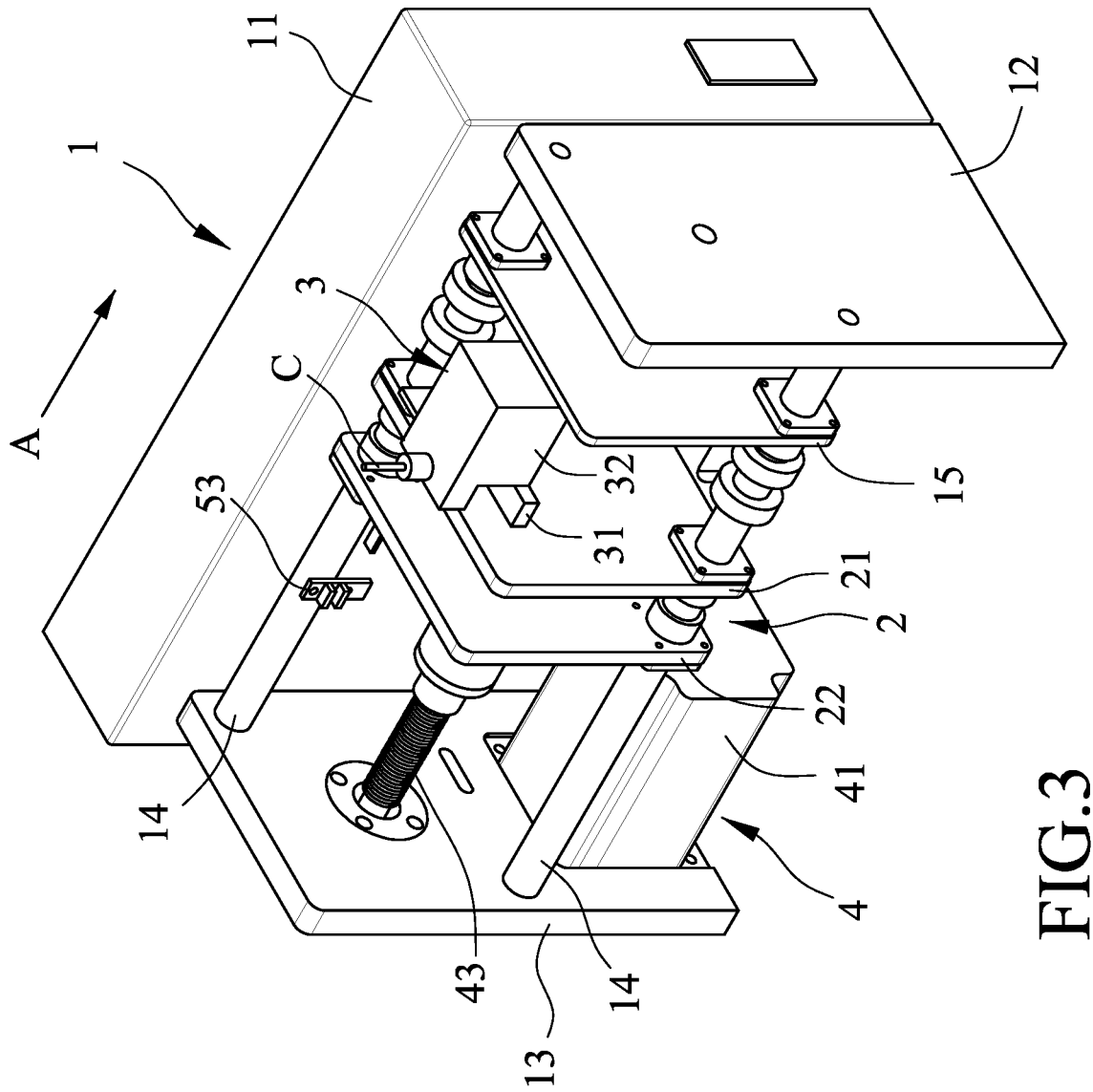
FIG. 3 is another perspective view illustrating the embodiment.

Referring to FIGS. 1 to 3, an embodiment of the molding machine teaching aid according to the disclosure includes a frame unit 1 able to be placed on a desktop, a molding unit 2 disposed on the frame unit 1, a material supply unit 3 disposed on the frame unit 1, a drive unit 4 for driving the molding unit 2, and a monitoring unit 5 for monitoring and controlling the material supply unit 3 and the drive unit 4.

The frame unit 1 includes a main frame body 11 disposed on the desktop and extending in a clamping direction (A), a first side wall 12 extending from the main frame body 11 in a horizontal direction (B) that is perpendicular to the clamping direction (A), a second side wall 13 spaced apart from the first side wall 12 in the clamping direction A and extending from the main frame body 11 in the horizontal direction (B), two slide rods 14 each extending in the clamping direction (A) and having two ends fixed respectively to the first side wall 12 and the second side wall 13, a carrier plate 15 fixed on the slide rods 14 and proximate to the first side wall 12, and a support arm 16 extending through the carrier plate 15 in the clamping direction (A) and having an end that is connected to the first side wall 12.

The slide rods 14 are spaced apart from each other in a direction oblique to the horizontal direction (B) and an up-down direction, so as to enhance stability of the frame unit 1.

The molding unit 2 includes a fixed die holder 21 that is penetrated by the slide rods 14 and that is fixed on the slide rods 14, a movable die holder 22 that is penetrated by the slide rods 14 and that faces the fixed die holder 21 in the clamping direction (A), and two die kernels 23 that are detachably disposed on the fixed die holder 21 and the movable die holder 22, respectively.

The fixed die holder 21 is proximate to the first side wall 12 and connects to the other end of the support arm 16 opposite to the first side wall 12.

The fixed die holder 21 and the first side wall 12 are respectively located at two opposite sides of the carrier plate 15 in the clamping direction (A).

The movable die holder 22 is proximate to the second side wall 13, and is slidable along the slide rods 14.

The material supply unit 3 includes an extruder 31 fixed on one of the slide rods 14 and located between the carrier plate 15 and the fixed die holder 21 in the clamping direction (A), a heating module 32 connected to the extruder 31 and fixed on the extruder 31, and a heat dissipation module 33 corresponding to the extruder 31 (only shown in FIG. 1 in a schematic manner).

In this embodiment, the heat dissipation module 33 is a fan that can control the rotating speed of a blade thereof.

The drive unit 4 includes a drive motor 41 that is fixed to the second side wall 13 and that is located below the slide rods 14, a transmission mechanism 42 that is linked to the drive motor 41 and that is disposed on an outer side of the second side wall 13, and a threaded shaft 43 that can be driven by the transmission mechanism 42, that is rotatably mounted to the second side wall 13, and that extends in the clamping direction (A) to engage threadably the movable die holder 22.

In this embodiment, the transmission mechanism 42 is a pulley-and-belt set, but is not limited to such.

The monitoring unit 5 includes a control module 51 (shown only in FIG. 1) signally connected to the extruder 31, the heating module 32, the heat dissipation module 33 of the material supply unit 3 and the drive motor 41, an operation display module 52 (shown only in FIG. 1) electrically connected to the control module 51, a limiting sensor 53 disposed on one of the sliding rods 14 and signally connected to the control module 51, and two temperature sensors 54 (shown only in FIG. 1) respectively disposed on the fixed and movable die holders 21, 22 and signally connected to the control module 51.

In this embodiment, the operation display module 52 may be an electronic device connected to the control module 51 through wireless network signals, or a touch panel directly connected to the control module 51, but is not limited to the aforesaid examples.

The control module 51 can similarly be wired or wirelessly signally connected to the extruder 31, the heating module 32, the heat dissipation module 33, the drive motor 41, the limiting sensor 53 and the temperature sensors 54.

However, the connecting wires are not illustrated in the figures in order to avoid confounding the drawings.

A user can place a wire material or a pellet of material (C) (or continuously place a plurality of wires or pellets of material (C)) into the heating module 32, and then operate the operation display module 52 to activate the drive motor 41. The drive motor 41 drives the transmission mechanism 42 to rotate the threaded shaft 43 to drive the movable die holder 22, which makes the movable die holder 22 slide along the slide rods 14 and move toward the fixed die holder 21 until the die kernels 23 are in close proximity to each other to cooperatively define a die cavity 24 therebetween.

Afterward, the user operates the operation display module 52 again so that the heating module 32 heats up to melt the wire material (C) to form a molten material. The extruder 31 then transports the molten material into the die cavity 24. The molten material may be transport directly through passages and holes formed in the fixed die holder 21 and the corresponding die kernel 23, or through external tubing into the die kernel 23.

Finally, the drive motor 41 again drives the movable die holder 22 to move toward the fixed die holder 21, so that the die kernels 23 are squeezed to perform press molding on the molten material in the die cavity 24, such that the molten material is formed into a finished product shaped to correspond to the shape of the die cavity 24. During the aforementioned pressing process, the support arm 16 may serve to support the fixed die holder 21 in the clamping direction (A).

After forming the finished product, the drive motor 41 drives the movable die holder 22 to move away from the fixed die holder 21, thereby separating the die kernels 23 from each other.

When the limiting sensor 53 detects that the movable die holder 22 is aligned with the limiting sensor 53 in the horizontal direction (B), the limiting sensor 53 sends a signal to the control module 51, causing the control module 51 to stop the drive motor 41 from continuing to operate and thereby stopping the movable die holder 22.

The user can set a target temperature of the molten material when it enters the die cavity 24 through operating the operation display module 52, and the temperature sensors 54 can sense the temperatures of the fixed die holder 21 and movable die holders 22. When there is a temperature difference between the fixed die holder 21 and movable die holders 22, temperature adjustments may be execute by the heating module 32 which serves to heat up, or the heat dissipating module 33 which serves to cool down for keeping the fixed die holder 21 and movable die holders 22 at a target temperature.

The molding machine teaching aid according to the disclosure is compact, can be stored in a box, and can be easily transported to various locations for education or demonstration.

Moreover, the molding machine teaching aid according to the disclosure not only can perform small batch production, but also has advantages of fast manufacturing and low cost. Since the die kernels 23 can be replaced at any time, the molding machine teaching aid according to the disclosure is applicable to rapid prototyping, and also facilitate time-limited classroom instruction.

In summary, the molding machine teaching aid according to the disclosure is able to allow the student to experience and understand the injection molding process and the influences caused by the setting of different parameters. In addition, the die kernels 23 can be replaced by different die kernels that cooperatively define a specific die cavity according to the finished product desired, which provides teaching flexibility and joy, so as to achieve the objective of the present invention.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A molding machine teaching aid adapted to be placed on a desktop comprising:
    a frame unit including a main frame body, a first side wall that is perpendicularly connected to said main frame body, a second side wall that is perpendicularly connected to said main frame body and spaced apart from said first side wall in a clamping direction, and a plurality of slide rods, each of which extends along the clamping direction and has two ends secured respectively to said first and second side walls;

a molding unit including a fixed die holder that is penetrated by said slide rods and that is fixed to said frame unit, a movable die holder that is penetrated by said slide rods and that faces said fixed die holder in the clamping direction, and two die kernels that are respectively and detachably disposed on said fixed die holder and said movable die holder, said die kernels cooperatively defining a die cavity after being closed;

a material supply unit including an extruder that is disposed on said frame unit, and a heating module that is connected to said extruder for heating at least one wire material into a molten material, said extruder transporting the molten material into said die cavity;

a drive unit controllable to drive movement of said movable die holder relative to said frame unit in the clamping direction to make said die kernels close to each other to be closed or moved away from each other; and a monitoring unit adapted for a user to operate to control said extruder, said heating module, and said drive unit;

wherein said first side wall and said second side wall of said frame unit are respectively proximate to said fixed die holder and said movable die holder, said frame unit further including a carrier plate that is fixed on said slide rods and located between said fixed die holder and said first side wall in the clamping direction, and a support arm that extends in the clamping direction and through said carrier plate, said support arm having two ends that are respectively connected to said first side wall and said fixed die holder.

2. The molding machine as claimed in claim 1, wherein said drive unit includes a drive motor, a transmission mechanism that is linked to said drive motor and that is disposed on said second side wall, and a threaded shaft that is driven by said transmission mechanism, that is rotatably mounted to said second side wall, and that extends in the clamping direction to be connected to said movable die holder.

3. The molding machine teaching aid as claimed in claim 2, wherein said monitoring unit includes a control module that is signally connected to said extruder and said heating module of said material supply unit and said drive motor of said drive unit, and an operation display module that is electrically connected to said control module.

4. The molding machine teaching aid as claimed in claim 3, wherein:

said monitoring unit further includes a limiting sensor disposed on said frame unit and located between said second side wall and said movable die holder in the clamping direction, said limiting sensor being signally connected to said control module; and when said limiting sensor detects that said movable die holder is aligned with said limiting sensor along a horizontal direction which is perpendicular to the clamping direction, said limiting sensor sends a signal to said control module, making said control module stop said drive motor from continuing to actuate.

5. The molding machine teaching aid as claimed in claim 3, wherein said monitoring unit further includes two temperature sensors respectively disposed on said fixed and movable die holders, and signally connected to said control module.

6. A molding machine teaching aid adapted to be placed on a desktop comprising:

a frame unit including a main frame body, a first side wall that is perpendicularly connected to said main frame body, a second side wall that is perpendicularly connected to said main frame body and spaced apart from said first side wall in a clamping direction, and a plurality of slide rods, each of which extends along the clamping direction and has two ends secured respectively to said first and second side walls;

a molding unit including a fixed die holder that is penetrated by said slide rods and that is fixed to said frame unit, a movable die holder that is penetrated by said slide rods and that faces said fixed die holder in the clamping direction, and two die kernels that are respectively and detachably disposed on said fixed die holder and said movable die holder, said die kernels cooperatively defining a die cavity after being closed;

a material supply unit including an extruder that is disposed on said frame unit, and a heating module that is connected to said extruder for heating at least one wire material into a molten material, said extruder transporting the molten material into said die cavity;

a drive unit controllable to drive movement of said movable die holder relative to said frame unit in the clamping direction to make said die kernels close to each other to be closed or moved away from each other; and a monitoring unit adapted for a user to operate to control said extruder, said heating module, and said drive unit;

wherein said material supply unit further includes a heat dissipation module signally connected to said monitoring unit for cooling said extruder.

* * * * *